United States Patent [19]

Bennett

[11] Patent Number: 4,596,602

[45] Date of Patent: Jun. 24, 1986

[54] METHOD OF PREPARING AN AQUEOUS MALTODEXTRIN SOLUTION HAVING MICROBIAL STABILITY AND DECREASED HAZE

[75] Inventor: Craig J. Bennett, Hazlet, N.J.

[73] Assignee: General Foods Corporation, White Plains, N.Y.

[21] Appl. No.: 669,543

[22] Filed: Nov. 8, 1984

[51] Int. Cl.$^4$ ............................................. C08B 30/18
[52] U.S. Cl. ........................................ 127/32; 127/71; 426/658; 536/103
[58] Field of Search ........................... 435/95, 99, 101; 536/103; 426/658; 127/32, 33, 65, 71

[56] References Cited

U.S. PATENT DOCUMENTS 3,974,033 8/1976 Harjes et al. .................. 426/658 X
3,974,034 8/1976 Horn et al. ..................... 426/658 X
4,187,326 2/1980 Serafino et al. ................ 426/658 X

OTHER PUBLICATIONS

Grant, Julius; Hackh's Chemical Dictionary 4th Edition 1972, p. 625.

*Primary Examiner*—Richard V. Fisher
*Assistant Examiner*—W. Gary Jones
*Attorney, Agent, or Firm*—Sam D. Walker; Thomas R. Savoie; Daniel J. Donovan

[57] ABSTRACT

Method of making a stable aqueous maltodextrin solution containing maltodextrin, water and sorbic acid and a suitable food grade acid to adjust the pH to 2–4. The solution, preferably stored at an elevated temperature of, e.g., 100° F., shows substantially no mold or yeast contamination after several months. The solution is preferably made up hot and transferred to shipping containers while hot.

5 Claims, No Drawings

4,596,602

METHOD OF PREPARING AN AQUEOUS MALTODEXTRIN SOLUTION HAVING MICROBIAL STABILITY AND DECREASED HAZE

BACKGROUND OF THE INVENTION

The present invention relates to aqueous solutions of maltodextrin and particularly to such solutions which are stable for at least a month or longer.

Maltodextrins are widely used in food products, particularly as a bodying agent for food or as an extender for sweeteners. Maltodextrins are made by hydrolysis of starch followed by enzymatic secondary acid conversion of the hydrolysate to produce maltodextrin having a D.E. of about 20 or less. Several maltodextrins are available commercially, most of which are sold as a solid, dried, product. The solid product is typically obtained by spray-drying an aqueous slurry or syrup of the maltodextrin.

For many uses, an aqueous maltodextrin product is desirable and several attempts have been made to provide such products. However, the aqueous maltodextrin solutions that have been made in the past have been unstable, both with respect to the development of haze which is accompanied by an increase in viscosity and eventual solidification, and to contamination with microorganisms, particularly molds and yeasts. For example, U.S. Pat. No. 3,974,034 discusses the development of haze in these products and discloses that three days is a long time for storage thereof. The patent goes on to disclose the use of oxidized starch as a starting material for producing maltodextrin and reports products which are free of haze after 60 days, 75 days, or the like. However, despite the presence of sodium bisulfite, the haze-free products showed mold growth and were discarded.

Prior attempts to prevent mold and yeast contamination by the addition of anti-mycotic agents have not been successful for various reasons, notably the introduction of off-taste and flavor when an anti-mycotic agent is used at a level sufficient to be effective.

It is an object of the present invention to provide an aqueous solution of maltodextrin which is stable against molds and yeast for a long period of time. It is a further object to provide such stable solutions without the need of special starting materials or of special methods of manufacturing maltodextrins. It is still a further object to provide such stable solutions using as a starting material a conventional maltodextrin slurry or syrup of the type conventionally used to make a stable dried maltodextrin product. It is a further object to provide such stable solutions using readily available materials, equipment and techniques. It is still a further object to provide such stable solutions using any desired maltodextrin product said product having a solids content of less than 75%.

BRIEF SUMMARY OF THE INVENTION

The foregoing and other objects which will be apparent to those having ordinary skill in the art are achieved in accordance with the present invention by providing an aqueous, food grade, maltodextrin solution comprising maltodextrin, 0.02-0.1% by weight sorbic acid based on the weight of the solution, and water in an amount sufficient to dissolve the maltodextrin, and sufficient food acid to effect a pH in the solution of from 2-4.

DETAILED DESCRIPTION

The maltodextrin in the present composition can be any desired maltodextrin product such as those readily available commercially. It is preferable to use a maltodextrin slurry or syrup of the type suitable for commercial preparation of a dried product by drying such as by spray-drying. These products may be obtained from a wide variety of starches and starchy materials such as waxy starches, non-waxy cereal starches, and the like.

The Dextrose Equivalence (D.E.) of maltodextrin ranges from 1 to about 20. The lower the D.E. the lower the solubility level and the greater the likelihood of haze formation. As the D.E. increases, the average length of the polysaccharide chain decreasing resulting in a more soluble maltodextrin.

It has been found that maltodextrin having a D.E. ranging from 15 to 20 is generally more stable against reversion reaction, and therefore, less likely to haze.

The amount of maltodextrin in the aqueous solution can vary widely as desired limited, of course, at the upper end by solubility. In general, an amount of 20–70% or 30–60% by weight maltodextrin will be suitable.

The amount of sorbic acid will generally be as little as possible to provide a solution which shows substantially no mold or yeast growth after storage at 100° F. for one month and preferably after three months. An amount of 0.02 to 0.1% by weight is generally suitable and an amount of 0.05 to 0.08 by weight is preferred. Potassium sorbate or other salts of sorbic acid can also be used due to their ability to convert to sorbic acid when the pH of the solution is lowered.

Another feature of the present invention is the reduction of haze formation. Hazing occurs when the short chain polysaccharide units recombine to form long chain polysaccharide units. These long chain units are less soluble and precipitate out of solution, resulting in sedimentation.

By reducing the pH/increasing the acidity and increasing the temperature haze formation is minimized. This is due to the decreased likelihood of shorter polysaccharide units recombining to form longer chains, less soluble polysaccharide chains. Traditionally reduction in haze formation has been accomplished by the addition of oxidized starch to the maltodextrin solution as set forth in U.S. Pat. No. 3,974,034 cited supra. This, however, results in off-taste and flavor. Reduction in solids also drastically reduces haze formation due to the presence of greater quantities of free water.

The pH of the solution is adjusted to from 2 to 4 and preferably 2.5–3.5. This is accomplished by the use of edible organic or inorganic acids. Hydrochloric acid is preferred due to its flavorless characteristic. It has been found that the maltodextrin solutions are particularly stable with sorbic acid at this pH.

It is also preferred to make up the solution at elevated temperature, generally in excess of 70° F. and more preferably from 130°–170° F. It is also preferred to store the solution prior to use at a temperature of at least 100° F., preferably 100°–145° F. The solution is preferably shipped to a user in a large volume shipment such as in a tanker or a rail car. The container is, of course, cleaned before use and the container is preferably filled sufficiently to minimize headspace.

The invention is illustrated in the Example which follows.

EXAMPLE

A portion of a maltodextrin slurry having a D.E. of 15 and suitable for spray-drying to form a food grade dried maltodextrin product is introduced into a blending tank and the solids level adjusted to a desired level, in this case 53.5% by weight, by adding water. The solution is heated to a temperature of about 175° F. Sorbic acid, in an amount of 0.075% by weight is added and the pH is adjusted to 3.0 with hydrochloric acid. The solution is pumped hot, at a temperature of 155° F., into clean rail cars or tanker trunks to a level which minimizes headspace, and transported to the user. The solution, maintained at a temperature of 100°–130° F., is stable for at least five months, is substantially free of yeast or mold growth after that time, and can be used in food products. If desired a liquid maltodextrin which has increased stability against haze formation can be made by following the above Example; either by reducing the solids level to about 48 or by changing to a higher D.E. maltodextrin (18–20 D.E.).

INNOCULATION STUDY

The following samples were innoculated with regular mold and yeast and osmophillic mold and yeast. This study was conducted over a period of four (4) weeks.

|   | Temperature | Acid (HCl) | pH | D.E. | Sorbic Acid | Solids | Haze | Microbial Growth |
|---|---|---|---|---|---|---|---|---|
| 1. | 77° F. | 0 | 4.0 | 10 | .065 | 52.5 | yes | yes |
| 2. | 100° F. | 0 | 4.0 | 10 | .065 | 52.5 | yes | yes |
| 3. | 130° F. | 0 | 4.0 | 10 | .065 | 52.5 | yes | no |
| 4. | 140° F. | 0 | 4.0 | 10 | .065 | 52.5 | yes | no |
| 5. | 150° F. | 0 | 4.0 | 10 | .065 | 52.5 | yes | no |

The above maltodextrin solution was not very stable resulting from a high level of reversion reaction. Also at the temperature approaches 130° F. the microbial growth decreases.

In the following study 0.075% sorbic acid was added together with 1.2 ml of 36N HCL/gallon of liquid maltodextrin. This study was conducted over a period of five (5) months.

|   | Temperature | Acid | pH | D.E. | Solids | Haze after four Weeks | Microbial Growth |
|---|---|---|---|---|---|---|---|
| 1. | 77° F. | yes | 3.0 | 14.5 | 53.5 | yes | yes |
| 2. | 100° F. | yes | 3.0 | 14.5 | 53.5 | no | no |
| 3. | 130° F. | yes | 3.0 | 14.5 | 53.5 | no | no |
| 4. | 140° F. | yes | 3.0 | 14.5 | 53.5 | no | no |

In an uninnoculated control group containing sorbic acid and HCl, none developed microbial growth, inclusive of the sample stored at 77° F. which developed haze at one month.

In an uninnoculated control group without sorbic acid and HCl all developed microbial growth, except for the sample that was stored at 140° F., which did not develop microbial growth but developed haze at one month as did the other samples.

What is claimed is:

1. A method of preparing an aqueous maltodextrin solution which comprises:
   admixing maltodextrin, water, sorbic acid and an acidifying agent to provide a food grade aqueous solution of maltodextrin having a pH of 2–4 and a sorbic acid content of 0.02–0.1% by weight;
   maintaining the temperature of said solution at 130°–190° F. during the admixing step;
   transferring the solution while it remains at said temperature of 130°–190° F. to a clean shipping container; and
   storing said solution prior to use at a temperature of at least 70° F.

2. A method according to claim 1 wherein the solution is stored prior to use at 100°–140° F.

3. The method according to claim 1 wherein said solution is stored for at least one month.

4. A method according to claim 1 comprising an additional step of adjusting the maltodextrin solids level by admixing additional water.

5. A method according to claim 1 wherein potassium sorbate is used to provide the sorbic acid component of the solution.

* * * * *